US012620676B2

(12) United States Patent
Xiao et al.

(10) Patent No.: US 12,620,676 B2
(45) Date of Patent: May 5, 2026

(54) SYSTEM AND METHOD FOR A CERAMIC-BASED COMPOSITE COATING FOR A COATED BATTERY SEPARATOR

(71) Applicant: GM GLOBAL TECHNOLOGY OPERATIONS LLC, Detroit, MI (US)

(72) Inventors: Xingcheng Xiao, Troy, MI (US); Mei Cai, Bloomfield Hills, MI (US); Sherman H. Zeng, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 709 days.

(21) Appl. No.: 18/094,138

(22) Filed: Jan. 6, 2023

(65) Prior Publication Data

US 2024/0234953 A1     Jul. 11, 2024

(51) Int. Cl.
*H01M 50/457*      (2021.01)
*H01M 10/0525*      (2010.01)

(52) U.S. Cl.
CPC ..... *H01M 50/457* (2021.01); *H01M 10/0525* (2013.01)

(58) Field of Classification Search
None
See application file for complete search history.

(56) References Cited

U.S. PATENT DOCUMENTS

| | | | | |
|---|---|---|---|---|
| 10,615,461 | B2 * | 4/2020 | Xiao | H01M 10/056 |
| 10,950,836 | B2 * | 3/2021 | Xiao | H01G 11/58 |
| 11,094,998 | B2 * | 8/2021 | Xiao | H01M 50/451 |
| 11,682,787 | B2 * | 6/2023 | Xiao | H01M 4/366 |
| | | | | 429/231.95 |
| 11,936,066 | B2 * | 3/2024 | Xiao | H01M 50/491 |
| 2018/0254449 | A1 * | 9/2018 | Xiao | H01M 50/449 |
| 2020/0403204 | A1 * | 12/2020 | Xiao | H01M 50/434 |
| 2023/0246295 | A1 * | 8/2023 | Xiao | H01M 50/451 |
| | | | | 429/144 |
| 2024/0047823 | A1 * | 2/2024 | Gao | H01M 10/0525 |

FOREIGN PATENT DOCUMENTS

WO      WO-2022146756  A1 *  7/2022   .........  H01M 50/451

OTHER PUBLICATIONS

WO 2022/146756 A1 Abstract (Year: 2022).*

* cited by examiner

*Primary Examiner* — Kevin M Bernatz
(74) *Attorney, Agent, or Firm* — Quinn IP Law

(57)       ABSTRACT

A coated polymer separator for a battery cell is provided. The coated polymer separator includes a polymer separator including a first primary surface and a second primary surface. The coated polymer separator further includes a ceramic-based composite coating disposed on the first primary surface and the second primary surface. The ceramic-based composite coating includes lithiated zeolite particles and particles of a second ceramic material including an oxide.

20 Claims, 5 Drawing Sheets

SYSTEM AND METHOD FOR A CERAMIC-BASED COMPOSITE COATING FOR A COATED BATTERY SEPARATOR

INTRODUCTION

The present disclosure relates to a system and method for a ceramic-based composite coating for a coated battery separator.

Lithium-ion batteries and lithium metal batteries are desirable candidates for powering electronic devices in the consumer, automotive, and aerospace industries due to their relatively high energy density, high power density, lack of memory effect, and long cycle life, as compared to other rechargeable battery technologies, including lead-acid batteries, nickel-cadmium and nickel-metal-hydride batteries. The widespread commercialization of lithium batteries, however, is dependent upon their ensured performance under normal operating conditions, in the event of manufacturing defects, upon aging, as well as under a variety of abuse conditions, including exposure to high temperatures, overcharge, over-discharge, and exposure to external forces that physically damage one or more internal components thereof. Conditions that affect the thermal, chemical, electrical, and/or physical stability of lithium batteries may increase the internal temperature of such batteries, which may, in turn, set-off additional undesirable events and/or chemical reactions within the batteries that may lead to additional heat generation.

SUMMARY

A coated polymer separator for a battery cell is provided. The coated polymer separator includes a polymer separator including a first primary surface and a second primary surface. The coated polymer separator further includes a ceramic-based composite coating disposed on the first primary surface and the second primary surface. The ceramic-based composite coating includes lithiated zeolite particles and particles of a second ceramic material including an oxide.

In some embodiments, the ceramic-based composite coating further includes the lithiated zeolite particles mixed with the particles of the second ceramic material.

In some embodiments, the ceramic-based composite coating further includes, on the first primary surface, a first layer including the lithiated zeolite particles and a second layer including the particles of the second ceramic material. The ceramic-based composite coating further includes, on the second primary surface, a third layer including the lithiated zeolite particles and a fourth layer including the particles of the second ceramic material.

In some embodiments, the first layer including the lithiated zeolite particles abuts the first primary surface of the polymer separator. The third layer including the lithiated zeolite particles abuts the second primary surface of the polymer separator.

In some embodiments, the second layer including the particles of the second ceramic material abuts the first primary surface of the polymer separator. The fourth layer including the particles of the second ceramic material abuts the second primary surface of the polymer separator.

In some embodiments, a layer of the lithiated zeolite particles is coated upon the first primary surface of the polymer separator. A layer of the second ceramic material is coated upon the second primary surface of the polymer separator.

In some embodiments, the second ceramic material is one of aluminum oxide ($Al_2O_3$), silicon dioxide ($SiO_2$), titanium dioxide ($TiO_2$), magnesium oxide (MgO), or Boehmite (Al(OH)O) ($AlHO_2$).

In some embodiments, lithiated zeolite is present within the ceramic-based composite coating in a range from 20 parts by weight per 100 parts by weight of the ceramic-based composite coating to 80 parts by weight per 100 parts by weight of the ceramic-based composite coating. The second ceramic material including an oxide may be present within the ceramic-based composite coating in a range from 20 parts by weight per 100 parts by weight of the ceramic-based composite coating to 80 parts by weight per 100 parts by weight of the ceramic-based composite coating.

In some embodiments, the lithiated zeolite present within the ceramic-based composite coating is controlled based upon a desired moisture to be retained within the coated polymer separator.

According to one alternative embodiment, a battery cell including a coated polymer separator is provided. The battery cell includes an anode, a cathode, an electrolyte, and the coated polymer separator. The coated polymer separator includes a polymer separator including a first primary surface and a second primary surface. The coated polymer separator further includes a ceramic-based composite coating disposed on the first primary surface and the second primary surface. The ceramic-based composite coating includes lithiated zeolite particles and particles of a second ceramic material including at least one oxide.

In some embodiments, the ceramic-based composite coating further includes the lithiated zeolite particles mixed with the particles of the second ceramic material.

In some embodiments, the ceramic-based composite coating further includes, on the first primary surface, a first layer including the lithiated zeolite particles and a second layer including the particles of the second ceramic material. The ceramic-based composite coating further includes, on the second primary surface, a third layer including the lithiated zeolite particles and a fourth layer including the particles of the second ceramic material.

In some embodiments, the first layer including the lithiated zeolite particles abuts the first primary surface of the polymer separator. The third layer including the lithiated zeolite particles abuts the second primary surface of the polymer separator.

In some embodiments, the second layer including the particles of the second ceramic material abuts the first primary surface of the polymer separator. The fourth layer including the particles of the second ceramic material abuts the second primary surface of the polymer separator.

In some embodiments, a layer of the lithiated zeolite particles is coated upon the first primary surface of the polymer separator, and a layer of the second ceramic material is coated upon the second primary surface of the polymer separator.

In some embodiments, the coated polymer separator further includes an adhesive layer on one side or two sides. The adhesive layer is laminated to the cathode or the anode. The adhesive layer affixes the cathode or the anode to the coated polymer separator.

In some embodiments, the second ceramic material is one of aluminum oxide ($Al_2O_3$), silicon dioxide ($SiO_2$), titanium dioxide ($TiO_2$), magnesium oxide (MgO), or Boehmite (Al(OH)O) ($AlHO_2$).

In some embodiments, lithiated zeolite is present within the ceramic-based composite coating in a range from 20 parts by weight per 100 parts by weight of the ceramic-based composite coating to 80 parts by weight per 100 parts by weight of the ceramic-based composite coating. The second ceramic material including an oxide may be present within the ceramic-based composite coating in a range from 20 parts by weight per 100 parts by weight of the ceramic-based composite coating to 80 parts by weight per 100 parts by weight of the ceramic-based composite coating.

According to one alternative embodiment, a method to create a coated polymer separator for a battery cell including a ceramic-based composite coating is provided. The method includes applying the ceramic-based composite coating to a first primary surface of a polymer separator and applying the ceramic-based composite coating to a second primary surface of the polymer separator. The method further includes drying the ceramic-based composite coating. The ceramic-based composite coating includes lithiated zeolite particles and particles of a second ceramic material including an oxide.

In some embodiments, the second ceramic material is one of aluminum oxide ($Al_2O_3$), silicon dioxide ($SiO_2$), titanium dioxide ($TiO_2$), magnesium oxide (MgO), or Boehmite ($Al(OH)O$) ($AlHO_2$).

The above features and advantages and other features and advantages of the present disclosure are readily apparent from the following detailed description of the best modes for carrying out the disclosure when taken in connection with the accompanying drawings.

DETAILED DESCRIPTION

Figure 1:
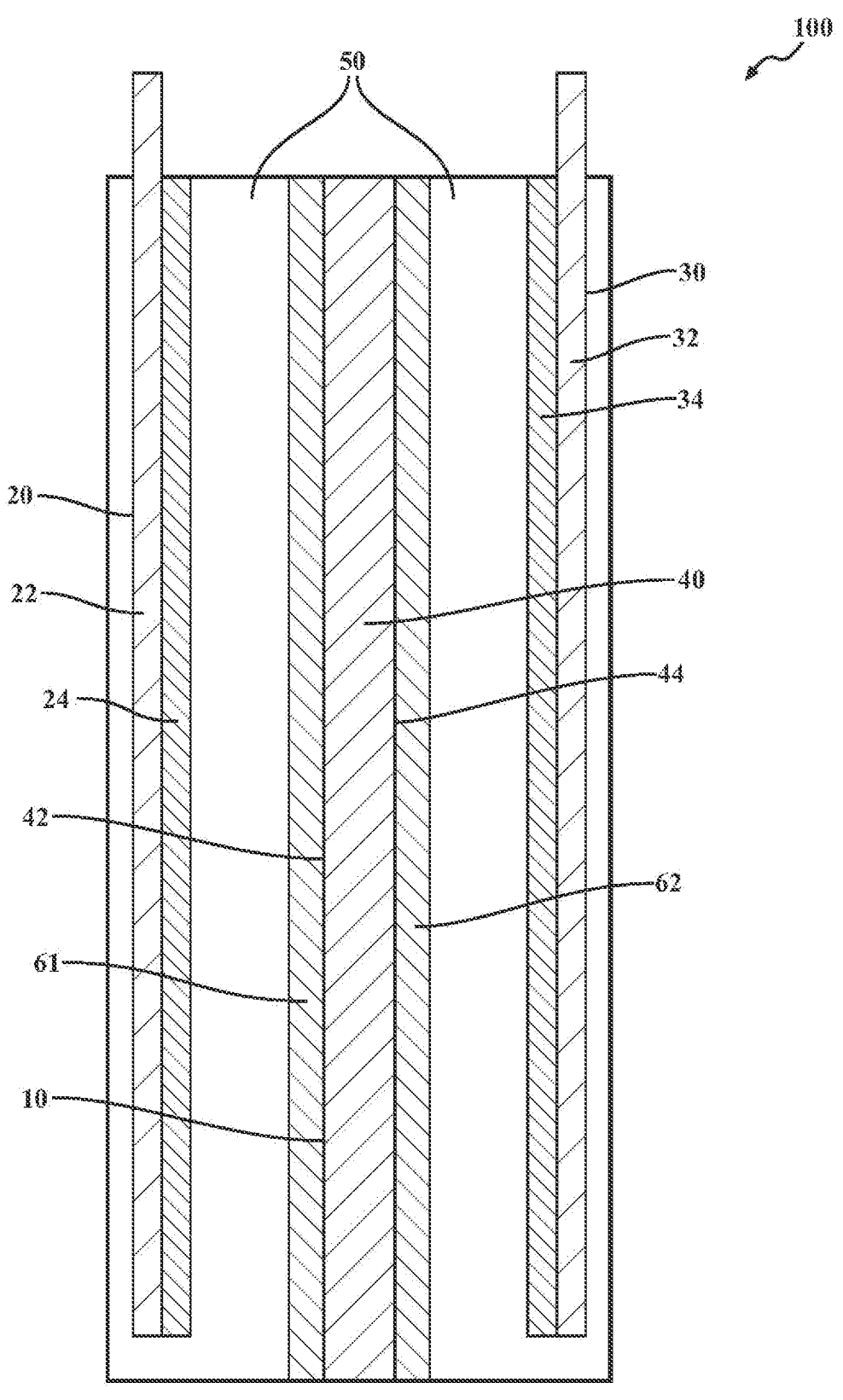
FIG. 1 schematically illustrates in cross-section an exemplary battery cell including coated polymer separator including a ceramic-based composite coating, in accordance with the present disclosure.

A battery system may include a plurality of battery cells. A battery cell may include an anode electrode, a cathode electrode, a polymer separator, and an electrolyte.

A ceramic-based composite coating for a coated polymer separator is provided. The ceramic-based composite coating on the coated polymer separator may include a first ceramic material, lithiated zeolite particles, and a second ceramic material. The second ceramic material may include an oxide including aluminum oxide ($Al_2O_3$), silicon oxide ($SiO_2$), magnesium oxide (MgO), titanium oxide ($TiO_2$), or boehmite ($AlO(OH)$). The term "lithiated zeolite" means a zeolite that has been ion-exchanged with lithium ions such that a plurality of lithium ions are present within the zeolite as free ions and/or as extra-framework ions. Methods of preparing dehydrated lithiated zeolite particles and incorporating dehydrated lithiated zeolite particles into one or more components of an electrochemical cell of a lithium battery are disclosed in commonly owned U.S. Pat. Nos. 10,483,592 and 10,615,461, each incorporated herein by reference in its entirety.

Providing lithiated zeolite improves the battery as a carrier to bring in flame retardant chemicals into the battery cell. Lithiated zeolite also functions as a hydrofluoric acid (HF) scavenger. Lithiated zeolite additionally traps trace water and transition metal ions in the electrolyte.

Lithiated zeolite provides relatively less mechanical strength as compared to other oxides. Further, lithiated zeolite is a relatively porous material as compared to other oxides. This high porosity of the lithiated zeolite may lead to an undesirably high amount of moisture being adsorbed in the separator. A mixture or ratio of the lithiated zeolite to the second ceramic material may be utilized to control moisture retained within the coated polymer separator. Utilizing the disclosed ceramic-based composite coating within the battery cell may take advantage of the benefits of the lithiated zeolite material while tempering less favorable properties of the lithiated zeolite material through the presence of the second ceramic material. Further, the disclosed ceramic-based composite coating may make the separator more compatible for a subsequent process of applying an adhesive layer to the separator.

The disclosed ceramic-based composite coating provides excellent resistance to mechanical damage of the polymer separator which may result from deformation or mechanical stresses upon the polymer separator and the battery cell. This disclosed ceramic-based composite coating provides excellent resistance to growing or accumulating dendrites piercing the polymer separator. The disclosed ceramic-based composite coating provides excellent resistance to high temperature conditions within a battery cell, protecting the polymer separator from thermal conditions that otherwise may cause a polymer separator to collapse.

Lithiated zeolite is relatively expensive as compared to other ceramic materials. Adding conventional ceramic particles listed above to create a ceramic-based composite coating provides the described benefits and may additionally reduce an overall cost of the coating.

The coating including the ceramic-based composite coating material may be a homogenous or nearly homogenous mixture of lithiated zeolite with the other oxide, with particles of the lithiated zeolite and particles of the other oxide intermixed. In another embodiment, a layer of the lithiated zeolite and a layer of the other oxide may be applied as a composite layer to a primary face of the polymer separator. In another embodiment, a layer of the lithiated zeolite may be applied to a first primary face of the polymer separator, and a layer of the other oxide may be applied to a second primary face of the polymer separator.

Mechanical and thermal stability of the coated polymer separator may be dependent on the thickness of ceramic coating. A relatively thicker coating leads to better mechanical and thermal stability but creates lower energy density. In one embodiment, a coating thickness of at least 3 microns on each side of the electrode is desirable.

The lithiated zeolite may be utilized as a carrier to bring fire retardant chemicals into a battery cell. During manufacture of the lithiated zeolite, the lithium in the lithiated zeolite may be provided from LiOH through ion-exchange.

The disclosed ceramic-based composite coating may be particularly useful for in battery cells where the chemistry has less transition metal dissolution issues.

The disclosed ceramic-based composite may include a mixture of lithiated zeolite with other conventional oxides including aluminum oxide ($Al_2O_3$), silicon dioxide ($SiO_2$), titanium dioxide ($TiO_2$), magnesium oxide (MgO), or Boehmite (Al(OH)O) ($AlHO_2$).

The lithiated zeolite may be present within the ceramic-based composite coating in a range from 20 parts by weight per 100 parts by weight of the ceramic-based composite coating to 80 parts by weight per 100 parts by weight of the ceramic-based composite coating. The second ceramic material including an oxide may be present within the ceramic-based composite coating in a range from 20 parts by weight per 100 parts by weight of the ceramic-based composite coating to 80 parts by weight per 100 parts by weight of the ceramic-based composite coating.

In an embodiment wherein the lithiated zeolite particles and the particles of the other oxide are intermixed, the particles of the lithiated zeolite and the particles of the second ceramic material including an oxide may include a diameter in a range from 100 nanometers to 3 microns (or 3 micrometers). In this embodiment, the particles may be selected to include in a diameter in a range from 300 nanometers to 500 nanometers. In this embodiment, the ceramic coating layer resulting from the application of the ceramic-based composite coating to the polymer separator includes a thickness in a range from 1 micron (or 1 micrometer) to 10 microns (or 10 micrometers). In this embodiment, a porosity of the ceramic coating layer may be in a range from 30% to 70%.

In another embodiment wherein separate layers of the lithiated zeolite and the other oxide are provided on each side of the polymer separator, the particles of the lithiated zeolite and the particles of the second ceramic material including an oxide may include a diameter in a range from 100 nanometers to 3 microns (or 3 micrometers). In this embodiment, the particles may be selected to include in a diameter in a range from 300 nanometers to 500 nanometers. In this embodiment, each of the lithiated zeolite layer and each of the other oxide layer include a thickness in a range from 1 micron (or 1 micrometer) to 10 microns (or 10 micrometers). In this embodiment, a porosity of the ceramic coating layer including the lithiated zeolite layer and the other oxide layer may be in a range from 30% to 70%. The lithiated zeolite layer and the other oxide layer may be applied to the polymer separator with the lithiated zeolite layer abutting the polymer separator. Such an embodiment where the lithiated zeolite layer abuts the polymer separator and where the other oxide layer is exposed may provide excellent compatibility with an adhesive layer that may be applied to exposed layer with a solvent based binder. In the alternative, the lithiated zeolite layer and the other oxide layer may be applied to the polymer separator with the other oxide layer abutting the polymer separator.

In an embodiment wherein a layer of the lithiated zeolite particles is applied to a first side of a planar sheet polymer separator and a layer of the other oxide particles is applied to a second side of the planar sheet polymer separator, the particles of the lithiated zeolite and the particles of the second ceramic material including an oxide may include a diameter in a range from 100 nanometers to 3 microns (or 3 micrometers). In this embodiment, the particles may be selected to include in a diameter in a range from 300 nanometers to 500 nanometers. In this embodiment, each of the layer of the lithiated zeolite particles and the layer of the other oxide particles include a thickness in a range from 1 micron (or 1 micrometer) to 10 microns (or 10 micrometers). The thickness of each of the layers may be selected to be 3 microns (or 3 micrometers). In this embodiment, a porosity of the ceramic coating layer may be in a range from 30% to 70%. The polymer separator including the layers applied may be disposed in an orientation with the layer of the other oxide particles facing the cathode or in an orientation with the layer of the other oxide particles facing the anode. In one embodiment, the polymer separator may be oriented with the layer of other oxide particles facing the cathode, an adhesive layer, for example, including a solvent-based binder, may be applied to the exposed surface of the layer of the other oxide particles, and the adhesive layer may be laminated to the cathode.

Referring now to the drawings, wherein like reference numbers refer to like features throughout the several views, FIG. 1 schematically illustrates in cross-section an exemplary battery cell 100 including coated polymer separator 10 including a polymer separator 40 including a ceramic-based composite coating 60. The battery cell 100 is illustrated including the polymer separator 40, an anode 20, a cathode 30, and an electrolyte 50. The anode 20 includes a current collector 22 and an anode electrode 24. The cathode 30 includes a current collector 32 and a cathode electrode 34.

The polymer separator 40 may be a planar sheet and is illustrated including a first primary surface 42 and a second primary surface 44. A first coating 61 of the ceramic-based composite coating 60 is applied to the first primary face 42. A second coating 62 of the ceramic-based composite coating 60 is applied to the second primary face 44.

The components of the battery cell 100 are illustrated with thicknesses for purposes of describing the various components and layers. Actual dimensions and thicknesses may vary, for example, with the actual thicknesses of the layers of the ceramic-based composite coating 60 being microscopic.

Figure 2:
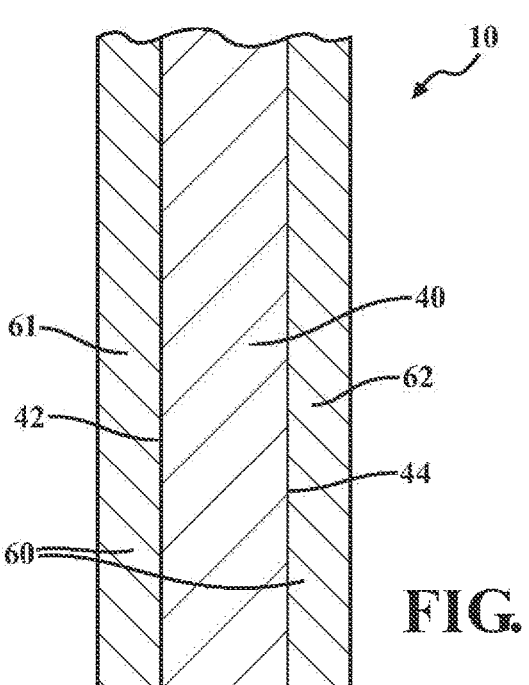
FIG. 2 schematically illustrates in magnified scale a portion of the coated polymer separator of FIG. 1, including a first embodiment of the ceramic-based composite coating, in accordance with the present disclosure.

FIG. 2 schematically illustrates in magnified scale a portion of the coated polymer separator 10 of FIG. 1, including a first embodiment of the ceramic-based composite coating 60. The first primary surface 42 of the polymer separator 40 and the second primary surface 44 of the polymer separator 40 are illustrated. The first coating 61 is illustrated applied to the first primary surface 42, and the second coating 62 is illustrated applied to the second primary surface 44. In the embodiment of FIG. 2, each of the first coating 61 and the second coating 62 include a mixture of two ceramics, including lithiated zeolite particles and particles of a second ceramic material including an oxide. Non-limiting examples of the second ceramic material include $Al_2O_3$, $SiO_2$, $TiO_2$, MgO, or Boehmite.

Figure 3:
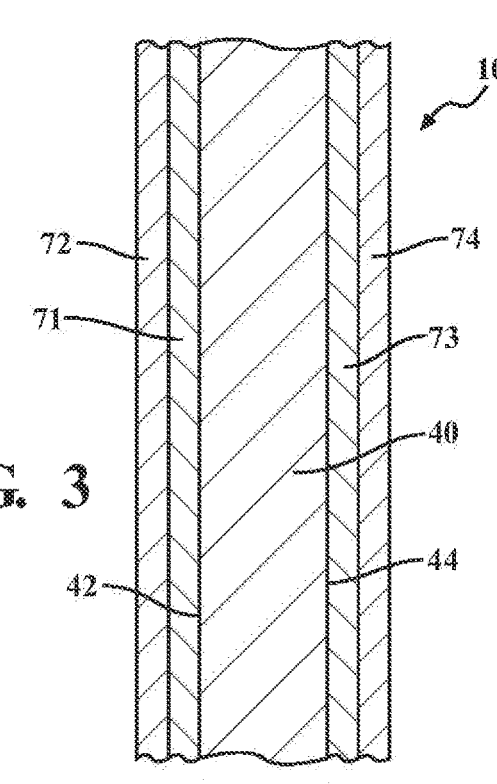
FIG. 3 schematically illustrates in magnified scale a portion of the coated polymer separator of FIG. 1, including a second embodiment of the ceramic-based composite coating, in accordance with the present disclosure.

FIG. 3 schematically illustrates in magnified scale a portion of the coated polymer separator 10 of FIG. 1, including a second embodiment of the ceramic-based composite coating 60. The first primary surface 42 of the polymer separator 40 and the second primary surface 44 of the polymer separator 40 are illustrated coated with the first coating 61 and the second coating 62, respectively.

The first coating 61 is illustrated including a first ceramic layer 71 and a second ceramic layer 72. One of the first ceramic layer 71 and the second ceramic layer 72 includes lithiated zeolite particles. The other of the first ceramic layer 71 and the second ceramic layer 72 includes particles of a second ceramic material including an oxide, such that the first coating 61 includes a layer of lithiated zeolite and a layer of the second ceramic material.

The second coating 62 is illustrated including a third ceramic layer 73 and a fourth ceramic layer 74. One of the third ceramic layer 73 and the fourth ceramic layer 74 includes lithiated zeolite particles. The other of the third ceramic layer 73 and the fourth ceramic layer 74 includes particles of a second ceramic material including an oxide, such that the second coating includes a layer of the lithiated zeolite and a layer of the second ceramic material.

Figure 4:
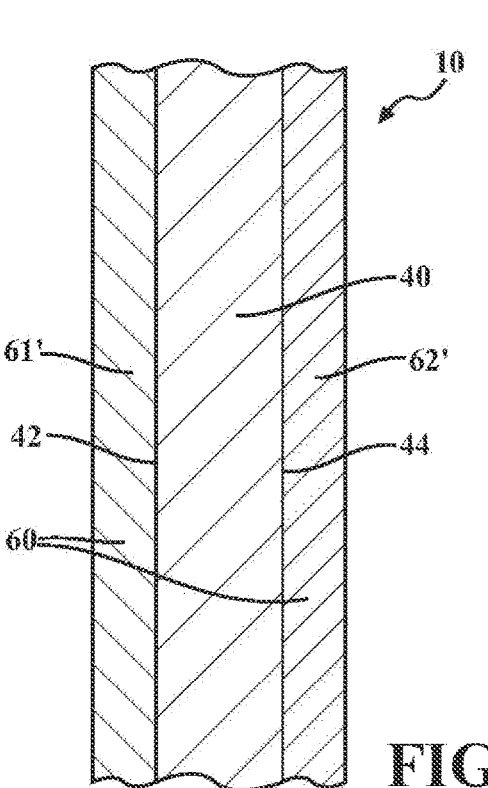
FIG. 4 schematically illustrates in magnified scale a portion of the coated polymer separator of FIG. 1, including a third embodiment of the ceramic-based composite coating, in accordance with the present disclosure.

FIG. 4 schematically illustrates in magnified scale a portion of the coated polymer separator 10 of FIG. 1, including a third embodiment of the ceramic-based composite coating 60. The first primary surface 42 of the polymer separator 40 and the second primary surface 44 of the polymer separator 40 are illustrated. The ceramic-based composite coating 60 is illustrated applied to the polymer separator 40. The ceramic-based composite coating 60 is illustrated including a first coating 61' and a second coating 62'.

One of the first coating 61' and the second coating 62' includes lithiated zeolite particles. The other of the first coating 61' and the second coating 62' includes particles of a second ceramic material including an oxide. As a result, one side of the polymer separator 40 includes a layer of lithiated zeolite, and a second side of the polymer separator 40 includes a layer of the second ceramic material.

Figure 5:
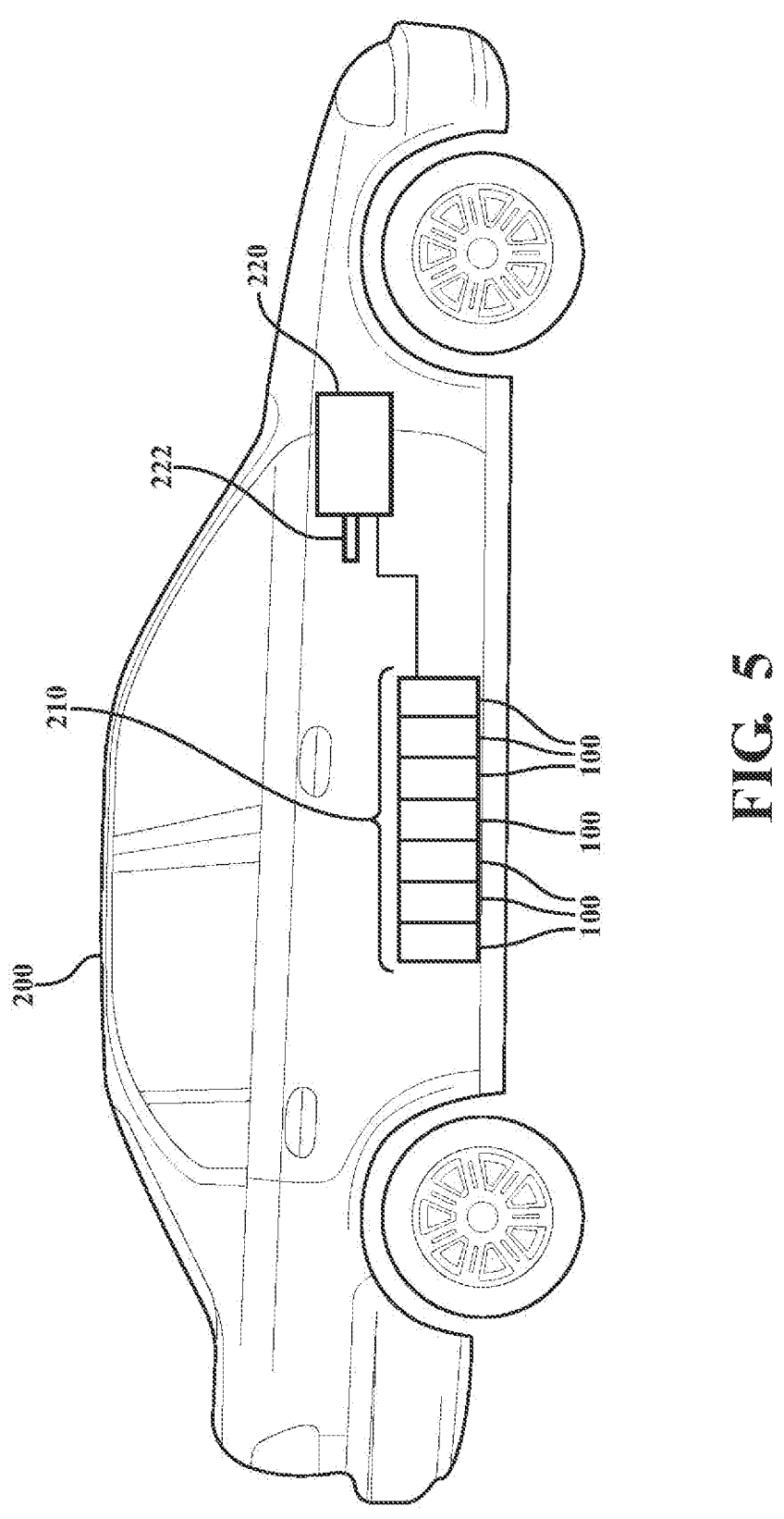
FIG. 5 schematically illustrates an exemplary device, e.g., a battery electric vehicle (BEV), including a battery pack that includes a plurality of battery cells, in accordance with the present disclosure.

The battery cell 100 may be utilized in a wide range of applications and powertrains. FIG. 5 schematically illustrates an exemplary device 200, e.g., a battery electric vehicle (BEV), including a battery pack 210 that includes a plurality of battery cells 100. The plurality of battery cells 100 may be connected in various combinations, for example, with a portion being connected in parallel and a portion being connected in series, to achieve goals of supplying electrical energy at a desired voltage. The battery pack 210 is illustrated as electrically connected to a motor generator unit 220 useful to provide motive force to the device 200. The motor generator unit 220 may include an output component 222, for example, an output shaft, which is provided mechanical energy useful to provide the motive force to the device 200. A number of variations to device 200 are envisioned, for example, including a powertrain, a boat, or an airplane, and the disclosure is not intended to be limited to the examples provided.

Figures 6, 7:
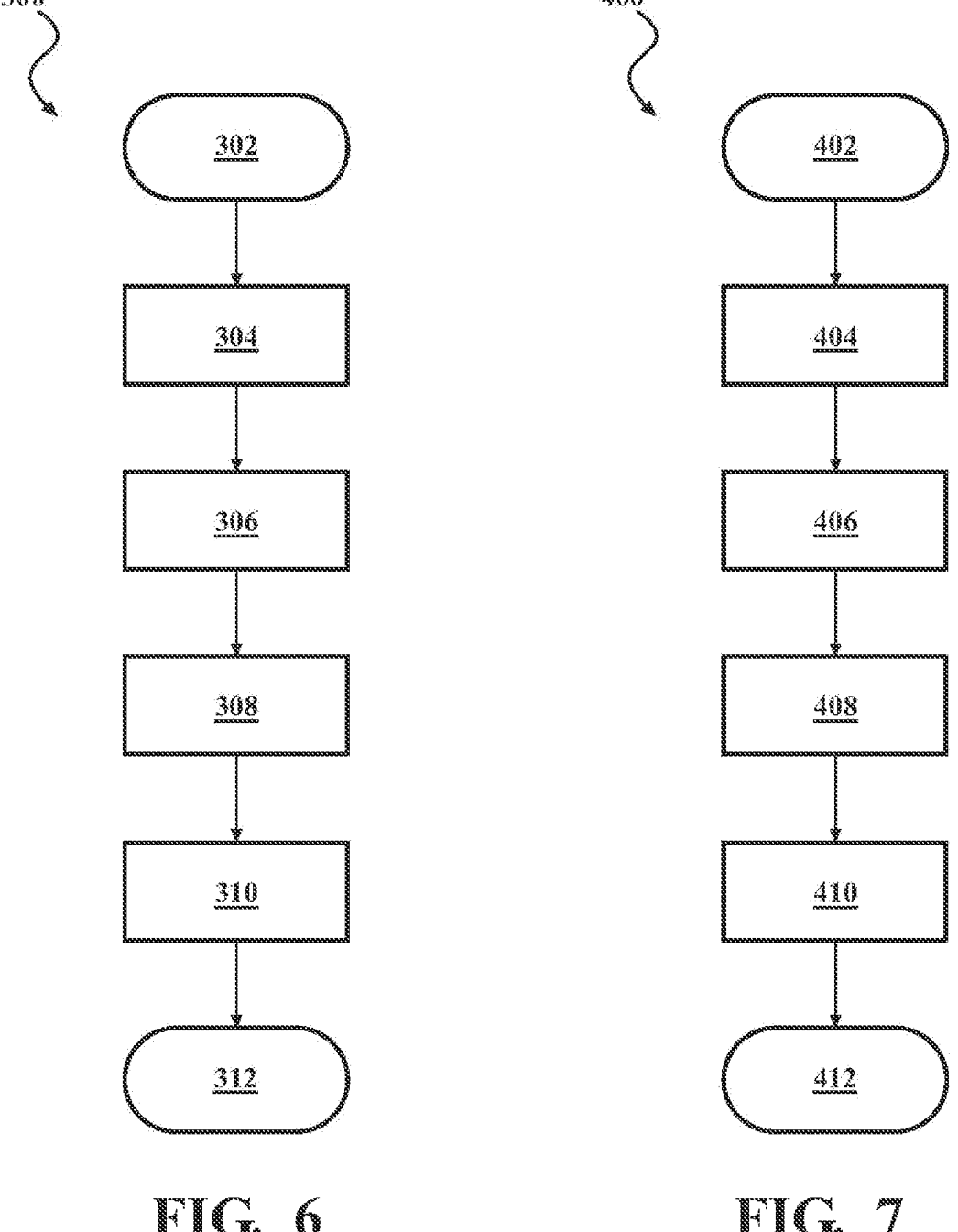
FIG. 6 is a flowchart illustrating a method for manufacturing the polymer separator of FIG. 1 including the ceramic-based composite coating of FIG. 2, in accordance with the present disclosure.
FIG. 7 is a flowchart illustrating a method for manufacturing the coated polymer separator of FIG. 1 including the ceramic-based composite coatings of FIG. 3 or 4, in accordance with the present disclosure.

FIG. 6 is a flowchart illustrating a method 300 for manufacturing the polymer separator 10 of FIG. 1 including the ceramic-based composite coating 60 of FIG. 2. The method 300 starts at step 302. At step 304, lithiated zeolite particles and particles of a second ceramic material are blended together and combined with a liquid and a polymer binder to create a coating slurry. At step 306, the coating slurry is applied to a first primary surface 42 and a second primary surface 44 of the polymer separator 40. At step 308, the polymer separator and the coating slurry applied to the first primary surface 42 and to the second primary surface 44 are dried to create the ceramic-based composite coating 60 upon the polymer separator 40. At step 310, the polymer separator 40 including the ceramic-based composite coating 60 is installed to the battery cell 100. At step 312, the method 300 ends. The method 300 is an exemplary method or process to manufacture the disclosed polymer separator 40. A number of additional and/or alternative method steps are envisioned, and the disclosure is not intended to be limited to the examples provided herein.

FIG. 7 is a flowchart illustrating a method 400 for manufacturing the coated polymer separator 10 of FIG. 1 including the ceramic-based composite coatings 60 of FIG. 3 or 4. The method 400 starts at step 402. At step 404, a first coating slurry including lithiated zeolite particles and a second coating slurry including particles of a second ceramic material are separately prepared. Depending upon a desired configuration of the ceramic-based composite coatings 60, the slurries prepared in step 404 may be applied in different sequences: for example, with the first slurry coating applied first or with the second slurry coating applied first. At step 406, a selected one of the first slurry coating and the second slurry coating is applied to the polymer separator 40. For the embodiment of FIG. 3, the selected coating slurry is applied to both primary surfaces 42, 44 of the polymer separator 40. For the embodiment of FIG. 4, the selected coating slurry is applied to one of the primary surfaces 42, 44 of the polymer separator 40.

At step 408, after the coating slurry applied in step 406 is permitted to dry, a remaining one of the first slurry coating and the second slurry coating is applied to the polymer separator 40 and is permitted to dry. For example, if first slurry coating including the lithiated zeolite is applied in step 406, then the second slurry coating including the second ceramic material is applied in the step 408. If the second slurry coating including the second ceramic material is applied in step 406, then the first slurry coating including the lithiated zeolites is applied in the step 408.

For the embodiment of FIG. 3, the remaining coating slurry of step 408 is applied over a top of the coating slurry applied in step 406 on both sides of the polymer separator 40, such that both sides of the polymer separator include a layer including the lithiated zeolite particles and a layer including the second ceramic material. For the embodiment of FIG. 4, the remaining coating slurry is applied to the primary surface 42, 44 of the polymer separator 40 that was not coated in the step 406, such that one side of the polymer separator 40 is coated with the lithiated zeolite and a second side of the polymer separator 40 is coated with the second ceramic material.

At step 410, the polymer separator 40 including the ceramic-based composite coating 60 is installed to the battery cell 100. At step 412, the method 400 ends. The method 400 is an exemplary method or process to manufacture the disclosed polymer separator 40 including the ceramic-based composite coating 60. A number of additional and/or alternative method steps are envisioned, and the disclosure is not intended to be limited to the examples provided herein.

Figure 8:
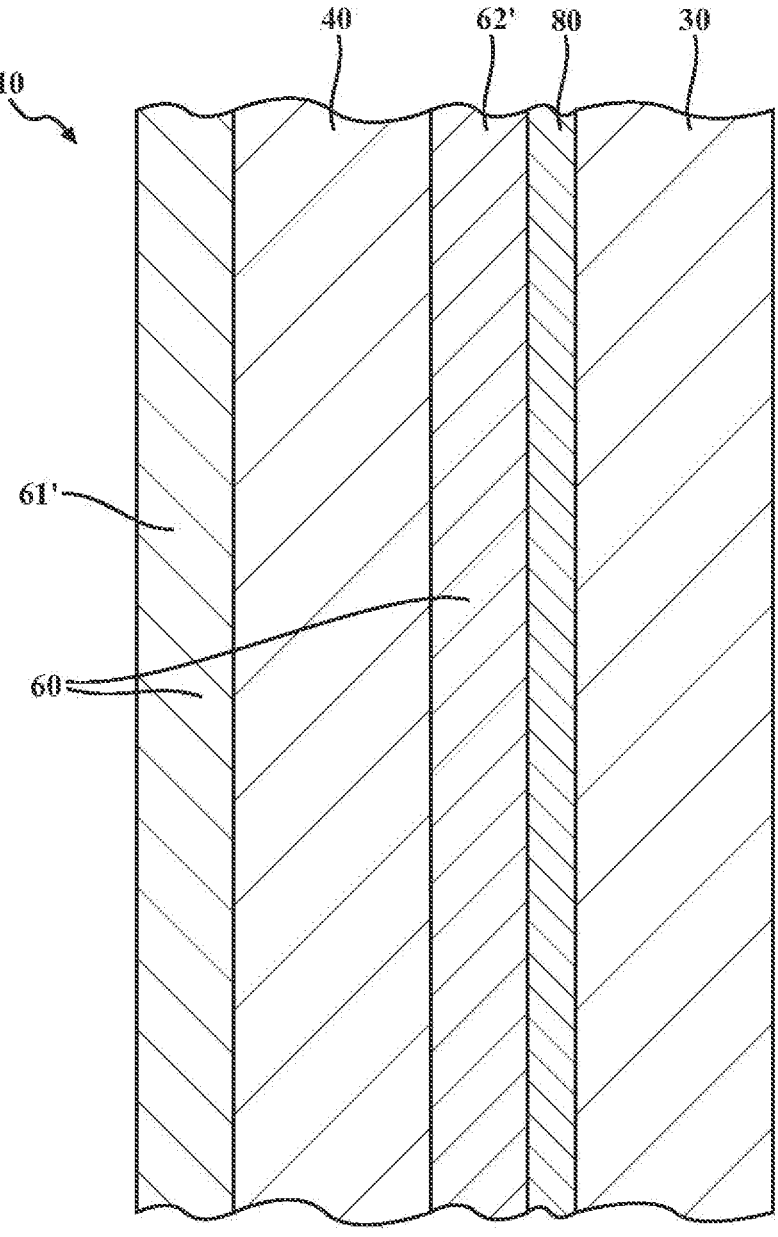
FIG. 8 schematically illustrates the coated polymer separator of FIG. 4, including the third embodiment of the ceramic-based composite coating, with a layer of adhesive attaching the cathode of FIG. 1 to the second coating, in accordance with the present disclosure.

FIG. 8 schematically illustrates the coated polymer separator 10 of FIG. 4, including the third embodiment of the ceramic-based composite coating 60, with a layer of adhesive 80 attaching the cathode 30 of FIG. 1 to the second coating 62'. The polymer separator 40 is illustrated including the first coating 61' and the second coating 62'. In one embodiment, utilizing the second ceramic material within the second coating 62' provides excellent adhesion between the layer of adhesive 80 and the second coating 62'. The layer of adhesive 80 affixes the cathode 30 to the second coating 62'. Layer of adhesive 80 is illustrated on one side of the coated polymer separator 10. In another embodiment, the layer of adhesive 80 may be additionally located on the second side of the coated polymer separator 10, for example, adhering the anode 20 to the coated polymer separator 10. In another embodiment, the anode 20 may be adhered to the coated polymer separator 10, and the cathode 30 may not be so adhered.

While the best modes for carrying out the disclosure have been described in detail, those familiar with the art to which this disclosure relates will recognize various alternative designs and embodiments for practicing the disclosure within the scope of the appended claims.

What is claimed is:

1. A coated polymer separator for a battery cell, the coated polymer separator comprising:
    a polymer separator including:
        a first primary surface; and
        a second primary surface; and
    a ceramic-based composite coating disposed on the first primary surface and the second primary surface, the ceramic-based composite coating including:
        lithiated zeolite particles; and
        particles of a second ceramic material including an oxide;
wherein the ceramic-based composite coating further includes, on the first primary surface:
    a first layer including the lithiated zeolite particles; and
    a second layer including the particles of the second ceramic material; and
wherein the ceramic-based composite coating further includes, on the second primary surface:
    a third layer including the lithiated zeolite particles; and
    a fourth layer including the particles of the second ceramic material.

2. The coated polymer separator of claim 1, wherein the ceramic-based composite coating further includes the lithiated zeolite particles mixed with the particles of the second ceramic material.

3. The coated polymer separator of claim 1, wherein the first layer including the lithiated zeolite particles abuts first primary surface of the polymer separator; and
    wherein the third layer including the lithiated zeolite particles abuts the second primary surface of the polymer separator.

4. The coated polymer separator of claim 1, wherein the second layer including the particles of the second ceramic material abuts the first primary surface of the polymer separator; and
    wherein the fourth layer including the particles of the second ceramic material abuts the second primary surface of the polymer separator.

5. The coated polymer separator of claim 1, wherein a layer of the lithiated zeolite particles is coated upon the first primary surface of the polymer separator; and
    wherein a layer of the second ceramic material is coated upon the second primary surface of the polymer separator.

6. The coated polymer separator of claim 1, wherein the second ceramic material is one of aluminum oxide ($Al_2O_3$), silicon dioxide ($SiO_2$), titanium dioxide ($TiO_2$), magnesium oxide (MgO), or Boehmite ($Al(OH)O)(AlHO_2$).

7. The coated polymer separator of claim 3, wherein lithiated zeolite is present within the ceramic-based composite coating in a range from 20 parts by weight per 100 parts by weight of the ceramic-based composite coating to 80 parts by weight per 100 parts by weight of the ceramic-based composite coating; and
    wherein the second ceramic material including an oxide may be present within the ceramic-based composite coating in a range from 20 parts by weight per 100 parts by weight of the ceramic-based composite coating to 80 parts by weight per 100 parts by weight of the ceramic-based composite coating.

8. The coated polymer separator of claim 7,
    wherein the coated polymer separator further includes an adhesive layer on one side or two sides;
    wherein the adhesive layer is laminated to the cathode or the anode; and
    wherein the adhesive layer affixes the cathode or the anode to the coated polymer separator.

9. A battery cell including a coated polymer separator, the battery cell comprising:
    an anode;
    a cathode;
    an electrolyte; and
    the coated polymer separator, including
        a polymer separator including:
            a first primary surface; and
            a second primary surface; and
        a ceramic-based composite coating disposed on the first primary surface and the second primary surface, the ceramic-based composite coating including:
            lithiated zeolite particles; and
            particles of a second ceramic material including at least one oxide;
wherein the ceramic-based composite coating further includes, on the first primary surface:
    a first layer including the lithiated zeolite particles; and
    a second layer including the particles of the second ceramic material; and
wherein the ceramic-based composite coating further includes, on the second primary surface:
    a third layer including the lithiated zeolite particles; and
    a fourth layer including the particles of the second ceramic material.

10. The battery cell of claim 9, wherein the ceramic-based composite coating further includes the lithiated zeolite particles mixed with the particles of the second ceramic material.

11. The battery cell of claim 9, wherein the first layer including the lithiated zeolite particles abuts the first primary surface of the polymer separator; and
    wherein the third layer including the lithiated zeolite particles abuts the second primary surface of the polymer separator.

12. The battery cell of claim 9, wherein the second layer including the particles of the second ceramic material abuts the first primary surface of the polymer separator; and
    wherein the fourth layer including the particles of the second ceramic material abuts the second primary surface of the polymer separator.

13. The battery cell of claim 12, wherein the coated polymer separator further includes an adhesive layer on one side or two sides;
    wherein the adhesive layer is laminated to the cathode or the anode; and
    wherein the adhesive layer affixes the cathode or the anode to the coated polymer separator.

14. The battery cell of claim 9, wherein a layer of the lithiated zeolite particles is coated upon the first primary surface of the polymer separator; and
    wherein a layer of the second ceramic material is coated upon the second primary surface of the polymer separator.

15. The battery cell of claim 9, wherein the second ceramic material is one of aluminum oxide ($Al_2O_3$), silicon dioxide ($SiO_2$), titanium dioxide ($TiO_2$), magnesium oxide (MgO), or Boehmite ($Al(OH)O)(AlHO_2$).

16. The battery cell of claim 9, wherein lithiated zeolite is present within the ceramic-based composite coating in a range from 20 parts by weight per 100 parts by weight of the ceramic-based composite coating to 80 parts by weight per 100 parts by weight of the ceramic-based composite coating; and wherein the second ceramic material including an oxide may be present within the ceramic-based composite coating in a range from 20 parts by weight per 100 parts by weight of the ceramic-based composite coating to 80 parts by weight per 100 parts by weight of the ceramic-based composite coating.

17. A method to create a coated polymer separator for a battery cell including a ceramic-based composite coating, the method comprising:

applying the ceramic-based composite coating to a first primary surface of a polymer separator;

applying the ceramic-based composite coating to a second primary surface of the polymer separator; and drying the ceramic-based composite coating; and wherein the ceramic-based composite coating includes:

lithiated zeolite particles; and particles of a second ceramic material including an oxide;

wherein the ceramic-based composite coating further includes, on the first primary surface:

a first layer including the lithiated zeolite particles; and a second layer including the particles of the second ceramic material; and wherein the ceramic-based composite coating further includes, on the second primary surface:

a third layer including the lithiated zeolite particles; and a fourth layer including the particles of the second ceramic material.

18. The method of claim 17, wherein the second ceramic material is one of aluminum oxide ($Al_2O_3$), silicon dioxide ($SiO_2$), titanium dioxide ($TiO_2$), magnesium oxide (MgO), or Boehmite ($Al(OH)O)(AlHO_2$).

19. The method of claim 17, wherein the first layer including the lithiated zeolite particles abuts the first primary surface of the polymer separator; and wherein the third layer including the lithiated zeolite particles abuts the second primary surface of the polymer separator.

20. The method of claim 17, wherein the second layer including the particles of the second ceramic material abuts the first primary surface of the polymer separator; and wherein the fourth layer including the particles of the second ceramic material abuts the second primary surface of the polymer separator.

* * * * *